United States Patent
Xu et al.

(10) Patent No.: US 10,480,288 B2
(45) Date of Patent: Nov. 19, 2019

(54) ARTICLES CONTAINING CARBON COMPOSITES AND METHODS OF MANUFACTURE

(71) Applicants: Zhiyue Xu, Cypress, TX (US); Lei Zhao, Houston, TX (US)

(72) Inventors: Zhiyue Xu, Cypress, TX (US); Lei Zhao, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 1007 days.

(21) Appl. No.: 14/514,510

(22) Filed: Oct. 15, 2014

(65) Prior Publication Data
US 2016/0108703 A1    Apr. 21, 2016

(51) Int. Cl.
*B32B 9/00* (2006.01)
*E21B 41/00* (2006.01)
(Continued)

(52) U.S. Cl.
CPC .......... *E21B 41/00* (2013.01); *B29C 43/52* (2013.01); *C04B 35/522* (2013.01);
(Continued)

(58) Field of Classification Search
CPC .......... B82Y 30/00; B82Y 10/00; H01B 1/04; H01B 1/24; Y10T 428/30
(Continued)

(56) References Cited

U.S. PATENT DOCUMENTS

| 3,807,996 A | 4/1974 | Sarah |
| 3,904,405 A | 9/1975 | Russell et al. |

(Continued)

FOREIGN PATENT DOCUMENTS

| CA | 2429780 A1 | 12/2003 |
| EP | 0539011 A1 | 4/1993 |

(Continued)

OTHER PUBLICATIONS

PCT International Search Report and Written Opinion; International Application No. PCT/US2015/054920; International Filing Date: Oct. 9, 2015; dated May 18, 2016; 12 pages.
(Continued)

*Primary Examiner* — Daniel H Miller
(74) *Attorney, Agent, or Firm* — Cantor Colburn LLP

(57) ABSTRACT

Articles comprising carbon composites are disclosed. The carbon composites contain carbon microstructures having interstitial spaces among the carbon microstructures; and a binder disposed in at least some of the interstitial spaces; wherein the carbon microstructures comprise unfilled voids within the carbon microstructures. Alternatively, the carbon composites contain: at least two carbon microstructures; and a binding phase disposed between the at least two carbon microstructures; wherein the binding phase comprises a binder comprising one or more of the following: $SiO_2$; Si; B; $B_2O_3$; a metal; or an alloy of the metal; and wherein the metal is at least one of aluminum; copper; titanium; nickel; tungsten; chromium; iron; manganese; zirconium; hafnium; vanadium; niobium; molybdenum; tin; bismuth; antimony; lead; cadmium; or selenium.

23 Claims, 9 Drawing Sheets

(51) Int. Cl.
| | |
|---|---|
| *B29C 43/52* | (2006.01) |
| *C09K 3/10* | (2006.01) |
| *C09K 5/14* | (2006.01) |
| *C10M 103/02* | (2006.01) |
| *E21B 33/12* | (2006.01) |
| *E21B 43/00* | (2006.01) |
| *E21B 10/25* | (2006.01) |
| *C04B 35/52* | (2006.01) |
| *C04B 35/536* | (2006.01) |
| *C04B 35/63* | (2006.01) |
| *C04B 35/645* | (2006.01) |
| *C04B 35/80* | (2006.01) |
| *C04B 35/82* | (2006.01) |
| *C04B 35/83* | (2006.01) |
| *C04B 38/00* | (2006.01) |
| *C22C 1/05* | (2006.01) |
| *B29L 31/26* | (2006.01) |

(52) U.S. Cl.
CPC ........ *C04B 35/536* (2013.01); *C04B 35/6316* (2013.01); *C04B 35/645* (2013.01); *C04B 35/806* (2013.01); *C04B 35/82* (2013.01); *C04B 35/83* (2013.01); *C04B 38/0022* (2013.01); *C04B 38/0054* (2013.01); *C09K 3/1003* (2013.01); *C09K 5/14* (2013.01); *C10M 103/02* (2013.01); *C22C 1/05* (2013.01); *E21B 10/25* (2013.01); *E21B 33/12* (2013.01); *E21B 43/00* (2013.01); *B29L 2031/26* (2013.01); *C04B 2235/3409* (2013.01); *C04B 2235/349* (2013.01); *C04B 2235/3418* (2013.01); *C04B 2235/3472* (2013.01); *C04B 2235/421* (2013.01); *C04B 2235/424* (2013.01); *C04B 2235/428* (2013.01); *C04B 2235/5216* (2013.01); *C04B 2235/5248* (2013.01); *C04B 2235/5292* (2013.01); *C04B 2235/5436* (2013.01); *C04B 2235/5445* (2013.01); *C04B 2235/5454* (2013.01); *C04B 2235/604* (2013.01); *C04B 2235/6021* (2013.01); *C04B 2235/665* (2013.01); *C04B 2235/667* (2013.01); *C04B 2235/77* (2013.01); *C04B 2235/94* (2013.01); *C04B 2235/96* (2013.01); *C04B 2235/9669* (2013.01); *C04B 2235/9692* (2013.01); *C10M 2201/0413* (2013.01)

(58) Field of Classification Search
USPC ........................................................ 428/408
See application file for complete search history.

(56) References Cited

U.S. PATENT DOCUMENTS

| | | |
|---|---|---|
| 3,956,568 A | 5/1976 | Kanemaru et al. |
| 3,967,935 A | 7/1976 | Frehn |
| 3,981,427 A | 9/1976 | Brookes |
| 4,116,451 A | 9/1978 | Nixon et al. |
| 4,205,858 A | 6/1980 | Shimazaki et al. |
| 4,234,638 A | 11/1980 | Yamazoe et al. |
| 4,270,569 A | 6/1981 | Reay et al. |
| 4,372,393 A | 2/1983 | Baker |
| 4,383,970 A | 5/1983 | Komuro et al. |
| 4,426,086 A | 1/1984 | Fournie et al. |
| 4,567,103 A | 1/1986 | Sara |
| 4,582,751 A * | 4/1986 | Vasilos .............. C04B 41/009 427/248.1 |
| 4,743,033 A | 5/1988 | Guess |
| 4,780,226 A | 10/1988 | Sheets et al. |
| 4,798,771 A | 1/1989 | Vogel |
| 4,799,956 A | 1/1989 | Vogel |
| 4,826,181 A | 5/1989 | Howard et al. |
| 4,885,218 A | 12/1989 | Andou et al. |
| 4,929,513 A * | 5/1990 | Kyono ................. C22C 49/14 164/97 |
| 5,117,913 A | 6/1992 | Thernig |
| 5,134,030 A | 7/1992 | Ueda et al. |
| 5,195,583 A | 3/1993 | Toon et al. |
| 5,201,532 A | 4/1993 | Salesky et al. |
| 5,225,379 A | 7/1993 | Howard |
| 5,228,701 A | 7/1993 | Greinke et al. |
| 5,247,005 A | 9/1993 | Von Bonin et al. |
| 5,257,603 A | 11/1993 | Bauer et al. |
| 5,283,121 A | 2/1994 | Bordner |
| 5,286,574 A | 2/1994 | Foster et al. |
| 5,392,982 A | 2/1995 | Li |
| 5,455,000 A | 10/1995 | Seyferth et al. |
| 5,467,814 A | 11/1995 | Hyman et al. |
| 5,494,753 A | 2/1996 | Anthony |
| 5,495,979 A | 3/1996 | Sastri et al. |
| 5,499,827 A | 3/1996 | Suggs et al. |
| 5,509,555 A | 4/1996 | Chiang et al. |
| 5,522,603 A | 6/1996 | Naitou et al. |
| 5,730,444 A | 3/1998 | Notter |
| 5,765,838 A | 6/1998 | Ueda et al. |
| 5,791,657 A | 8/1998 | Cain et al. |
| 5,968,653 A | 10/1999 | Coppella et al. |
| 5,992,857 A | 11/1999 | Ueda et al. |
| 6,020,276 A | 2/2000 | Hoyes et al. |
| 6,027,809 A | 2/2000 | Ueda et al. |
| 6,065,536 A | 5/2000 | Gudmestad et al. |
| 6,075,701 A | 6/2000 | Ali et al. |
| 6,105,596 A | 8/2000 | Hoyes et al. |
| 6,128,874 A | 10/2000 | Olson et al. |
| 6,131,651 A | 10/2000 | Richy, III |
| 6,152,453 A | 11/2000 | Kashima et al. |
| 6,161,838 A | 12/2000 | Balsells |
| 6,182,974 B1 | 2/2001 | Harrelson |
| 6,183,667 B1 | 2/2001 | Kubo et al. |
| 6,234,490 B1 | 5/2001 | Champlin |
| 6,258,457 B1 | 7/2001 | Ottinger et al. |
| 6,273,431 B1 | 8/2001 | Webb |
| 6,383,656 B1 | 5/2002 | Kimura et al. |
| 6,506,482 B1 | 1/2003 | Burton et al. |
| 6,585,053 B2 | 7/2003 | Coon et al. |
| 6,789,634 B1 | 9/2004 | Denton |
| 6,880,639 B2 | 4/2005 | Rhodes et al. |
| 6,933,531 B1 | 8/2005 | Ishikawa et al. |
| 7,105,115 B2 | 9/2006 | Shin |
| 7,132,077 B2 | 11/2006 | Norville et al. |
| 7,138,190 B2 | 11/2006 | Bauer et al. |
| 7,470,468 B2 | 12/2008 | Mercuri et al. |
| 7,666,469 B2 | 2/2010 | Weintritt et al. |
| 7,758,783 B2 | 7/2010 | Shi et al. |
| 8,272,816 B2 * | 9/2012 | Mirchandani .......... B22F 7/062 407/118 |
| 9,325,012 B1 | 4/2016 | Xu et al. |
| 2001/0003389 A1 | 6/2001 | Pippert |
| 2001/0039966 A1 | 11/2001 | Walpole et al. |
| 2002/0114952 A1 | 8/2002 | Ottinger et al. |
| 2003/0137112 A1 | 7/2003 | Richter et al. |
| 2004/0026085 A1 | 2/2004 | Vacik et al. |
| 2004/0097360 A1 | 5/2004 | Benitsch et al. |
| 2004/0121152 A1 | 6/2004 | Toas |
| 2004/0127621 A1 | 7/2004 | Drzal et al. |
| 2004/0155382 A1 | 8/2004 | Huang et al. |
| 2004/0186201 A1 | 9/2004 | Stoffer et al. |
| 2006/0042801 A1 | 3/2006 | Hackworth et al. |
| 2006/0220320 A1 | 10/2006 | Potier et al. |
| 2006/0241237 A1* | 10/2006 | Drzal ...................... C08K 3/04 524/495 |
| 2006/0249917 A1 | 11/2006 | Kosty |
| 2006/0272321 A1 | 12/2006 | Mockenhaupt et al. |
| 2007/0009725 A1 | 1/2007 | Noguchi et al. |
| 2007/0054121 A1 | 3/2007 | Weintritt et al. |
| 2007/0142547 A1 | 6/2007 | Vaidya et al. |
| 2007/0243407 A1 | 10/2007 | Delannay et al. |
| 2007/0257405 A1 | 11/2007 | Freyer |
| 2008/0128067 A1 | 6/2008 | Sayir et al. |
| 2008/0152577 A1 | 6/2008 | Addiego et al. |

(56) References Cited

U.S. PATENT DOCUMENTS

| | | |
|---|---|---|
| 2008/0175764 A1 | 7/2008 | Sako |
| 2008/0279710 A1 | 11/2008 | Zhamu et al. |
| 2008/0289813 A1 | 11/2008 | Gewily et al. |
| 2009/0059474 A1 | 3/2009 | Zhamu et al. |
| 2009/0075120 A1* | 3/2009 | Cornie ............... C22C 32/0084 428/698 |
| 2009/0130515 A1 | 5/2009 | Son et al. |
| 2009/0151847 A1 | 6/2009 | Zhamu et al. |
| 2009/0194205 A1 | 8/2009 | Loffler et al. |
| 2009/0295103 A1 | 12/2009 | Ebina et al. |
| 2009/0302552 A1 | 12/2009 | Leinfelder |
| 2010/0003530 A1 | 1/2010 | Ganguli et al. |
| 2010/0098956 A1 | 4/2010 | Sepeur et al. |
| 2010/0122821 A1 | 5/2010 | Corre et al. |
| 2010/0143690 A1 | 6/2010 | Romero et al. |
| 2010/0159357 A1 | 6/2010 | Otawa et al. |
| 2010/0163782 A1 | 7/2010 | Chang et al. |
| 2010/0203340 A1 | 8/2010 | Ruoff et al. |
| 2010/0207055 A1 | 8/2010 | Ueno et al. |
| 2010/0266790 A1 | 10/2010 | Kusinski et al. |
| 2011/0033721 A1 | 2/2011 | Rohatgi |
| 2011/0045724 A1 | 2/2011 | Bahukudumbi |
| 2011/0157772 A1 | 6/2011 | Zhamu et al. |
| 2011/0200825 A1 | 8/2011 | Chakraborty et al. |
| 2011/0278506 A1 | 11/2011 | Toyokawa |
| 2012/0107590 A1 | 5/2012 | Xu et al. |
| 2013/0001475 A1 | 1/2013 | Christ et al. |
| 2013/0045423 A1 | 2/2013 | Lim et al. |
| 2013/0096001 A1 | 4/2013 | Choi et al. |
| 2013/0114165 A1 | 5/2013 | Mosendz et al. |
| 2013/0284737 A1 | 10/2013 | Ju et al. |
| 2013/0287326 A1 | 10/2013 | Porter et al. |
| 2013/0292138 A1 | 11/2013 | Givens et al. |
| 2014/0051612 A1 | 2/2014 | Mazyar et al. |
| 2014/0127526 A1 | 5/2014 | Etschmaier et al. |
| 2014/0224466 A1 | 8/2014 | Lin et al. |
| 2014/0272592 A1 | 9/2014 | Thompkins et al. |
| 2015/0027567 A1 | 1/2015 | Shreve et al. |
| 2015/0034316 A1 | 2/2015 | Hallundbäk et al. |
| 2015/0068774 A1 | 3/2015 | Hallundbäk et al. |
| 2015/0158773 A1 | 6/2015 | Zhao et al. |
| 2015/0218676 A1 | 8/2015 | Nakamura et al. |
| 2015/0267816 A1 | 9/2015 | Boskovski |
| 2016/0089648 A1 | 3/2016 | Xu et al. |
| 2016/0130519 A1 | 5/2016 | Lei et al. |
| 2016/0136923 A1 | 5/2016 | Zhao et al. |
| 2016/0136928 A1 | 5/2016 | Zhao et al. |
| 2016/0138359 A1 | 5/2016 | Zhao et al. |
| 2016/0145965 A1 | 5/2016 | Zhao et al. |
| 2016/0145966 A1 | 5/2016 | Zhao et al. |
| 2016/0145967 A1 | 5/2016 | Zhao et al. |
| 2016/0146350 A1 | 5/2016 | Zhao et al. |
| 2016/0160602 A1 | 6/2016 | Ruffo |
| 2016/0176764 A1 | 6/2016 | Xu et al. |
| 2016/0186031 A1 | 6/2016 | Zhao et al. |
| 2016/0333657 A1 | 11/2016 | Zhao et al. |
| 2017/0321069 A1 | 11/2017 | Zhao et al. |

FOREIGN PATENT DOCUMENTS

| | | |
|---|---|---|
| EP | 0747615 B1 | 10/2001 |
| EP | 2056004 A1 | 5/2009 |
| EP | 2130932 A2 | 12/2009 |
| EP | 2586963 A1 | 5/2013 |
| JP | S5424910 A | 2/1979 |
| JP | S5491507 A | 7/1979 |
| JP | S58181713 A | 10/1983 |
| JP | S6131355 A | 2/1986 |
| JP | H0238365 A | 2/1990 |
| JP | H0616404 A | 1/1994 |
| JP | 08198678 A | 8/1996 |
| JP | 2014141746 | 8/2014 |
| WO | 9403743 | 2/1994 |
| WO | 03102360 | 12/2003 |
| WO | 2004015150 A2 | 2/2004 |
| WO | 2005115944 | 12/2005 |
| WO | 2007138409 A1 | 12/2007 |
| WO | 2008021033 A2 | 2/2008 |
| WO | 2011039531 A1 | 4/2011 |
| WO | 2012154183 A1 | 11/2012 |
| WO | 2014028149 A1 | 2/2014 |
| WO | 2015021627 A1 | 2/2015 |
| WO | 2016043876 A1 | 3/2016 |
| WO | 2016053510 A1 | 4/2016 |
| WO | 2016099611 A2 | 6/2016 |

OTHER PUBLICATIONS

International Search Report and Written Opinion, International Application No. PCT/US2015/046797, dated Jul. 1, 2016, Korean Intellectual Property Office; Written Opinion 10 pages, International Search Report 4 pages.

International Search Report, International Application No. PCT/US2015/049958, dated Nov. 23, 2015, Korean Intellectual Property Office; International Search Report 4 pages.

Rashad et al. "Effect of of Graphene Nanoplatelets addition on mechanical properties of pure aluminum using a semi-powder method", Materials International, Apr. 20, 2014, vol. 24, pp. 101-108.

Written Opinion of the International Searching Authority, International Application No. PCT/US2015/049958, dated Nov. 23, 2015, Korean Intellectual Property Office; Written Opinion 7 pages.

Baxter et al., "Microstructure and solid particle erosion of carbon-based materials used for the protection of highly porous carbon-carbon composite thermal insulation", Journal of Materials Science, vol. 32, 1997, pp. 4485-4492.

Etter et al., "Aluminium carbide formation in interpenetrating graphite/aluminium composites", Materials Science and Engineering, Mar. 15, 2007, vol. 448, No. 1, pp. 1-6.

Hutsch et al., "Innovative Metal-Graphite Composites as Thermally Conducting Materials", PM2010 World Congress—PM Functional Materials—Heat Sinks, 2010, 8 pages.

International Search Report and Written Opinion; International Application No. PCT/US2014/065389; International Filing Date: Nov. 13, 2014; dated Mar. 18, 2015; 15 pages.

International Search Report and Written Opinion; International Application No. PCT/US2015/056196; International Filing Date: Oct. 19, 2015; dated Jan. 26, 2016; 13 pages.

Levin et al., "Solid Particle Erosion Resistance and High Strain Rate Deformation Behavior of Inconel-625 Alloy", Superalloys 718, 625, 706 and Various Derivatives, The Minerals, Metals & Materials Society, 1997, 10 pages.

Pohlmann et al., "Magnesium alloy-graphite composites with tailored heat conduction properties for hydrogen storage applications", International Journal of Hydrogen Energy, 35 (2010), pp. 12829-12836.

Tikhomirov et al., "The chemical vapor infiltration of exfoliated graphite to produce carbon/carbon composites", Carbon, 49 (2011), pp. 147-153.

Yang et al., "Effect of tungsten addition on thermal conductivity of graphite/copper composites", Composites Part B: Engineering, May 31, 2013, vol. 55, pp. 1-4.

Moghadam et al, "Functional Metal Matrix Composites: Self-lubricating, Self-healing, and Nanocomposites—An Outlook", The Minerals, Metals & Materials Society, Apr. 5, 2014, 10 pages.

Miyamoto et al., "Development of New Composites; Ceramic Bonded Carbon", Transactions of JWRI, vol. 38, No. 2, 2009, pp. 57-61.

European Search Report, European Application No. 15851570.0, dated Aug. 2, 2018, European Patent Office; European Search Report 18 pages.

Prieto et al. "Fabrication and properties of graphite flakes/metal composites for thermal management applications", Scripta Materialia 59 (2008) 11-14.

* cited by examiner 20 hr, 200°F 3 days, 200°F 20 hr, 200°F 3 days, 200°F

ARTICLES CONTAINING CARBON COMPOSITES AND METHODS OF MANUFACTURE

BACKGROUND

Graphite is an allotrope of carbon and has a layered, planar structure. In each layer, the carbon atoms are arranged in hexagonal arrays or networks through covalent bonds. Different carbon layers however are held together only by weak van der Waals forces.

Graphite has been used in a variety of applications including electronics, atomic energy, hot metal processing, coatings, aerospace and the like due to its excellent thermal and electrical conductivities, lightness, low friction, and high heat and corrosion resistances. However, graphite is not elastic and has low strength, which may limit its further applications. Thus, the industry is always receptive to new graphite materials having improved elasticity and mechanical strength. It would be a further advantage if such materials also have improved high temperature corrosion resistance.

BRIEF DESCRIPTION

The above and other deficiencies in the prior art are overcome by, in an embodiment, a carbon composite and an article comprising the carbon composite. In an embodiment, the article comprises a carbon composite containing carbon microstructures having interstitial spaces among the carbon microstructures; and a binder disposed in at least some of the interstitial spaces; wherein the carbon microstructures comprise unfilled voids within the carbon microstructures.

In another embodiment, the article comprises a carbon composite containing: at least two carbon microstructures; and a binding phase disposed between the at least two carbon microstructures; wherein the binding phase includes a binder comprising one or more of the following: $SiO_2$; Si; B; $B_2O_3$; a metal; or an alloy of the metal; and wherein the metal is at least one of aluminum; copper; titanium; nickel; tungsten; chromium; iron; manganese; zirconium; hafnium; vanadium; niobium; molybdenum; tin; bismuth; antimony; lead; cadmium; or selenium.

A method of forming an article comprises at least one of shaping or machining the carbon composite.

In an another embodiment, a method of forming an article comprising a carbon composite comprises: compressing a composition containing carbon and a binder at a temperature of about 350° C. to about 1200° C. and a pressure of about 500 psi to about 30,000 psi to form the article; wherein the binder comprises one or more of the following: $SiO_2$; Si; B; $B_2O_3$; a metal; or an alloy of the metal; and wherein the metal is at least one of aluminum; copper; titanium; nickel; tungsten; chromium; iron; manganese; zirconium; hafnium; vanadium; niobium; molybdenum; tin; bismuth; antimony; lead; cadmium; or selenium.

In yet another embodiment, a method for forming an article comprising a carbon composite comprises: forming a compact by pressing a composition comprising carbon and a binder; and heating the compact to form the article; wherein the binder comprises one or more of the following: $SiO_2$; Si; B; $B_2O_3$; a metal; or an alloy of the metal; and wherein the metal is at least one of aluminum; copper; titanium; nickel; tungsten; chromium; iron; manganese; zirconium; hafnium; vanadium; niobium; molybdenum; tin; bismuth; antimony; lead; cadmium; or selenium.

A method of producing hydrocarbons from a subterranean location having an ambient temperature of greater than 750° F. comprises: employing one or more of the articles.

A method of isolating or completing a wellbore comprises deploying an apparatus comprising one or more of the articles in a wellbore.

BRIEF DESCRIPTION OF THE DRAWINGS

The following descriptions should not be considered limiting in any way. With reference to the accompanying drawings, like elements are numbered alike:

FIG. 9 (B) illustrates the condition for the thermal shock;

(FIG. 10C);

DETAILED DESCRIPTION

Figure 1:
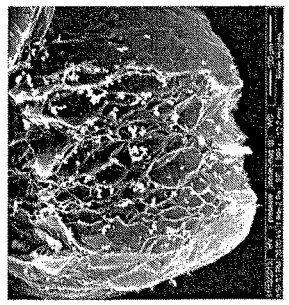
FIG. 1 is a scanning electron microscopic ("SEM") image of a composition containing expanded graphite and a micro- or nano-sized binder blended at room temperature and atmospheric pressure.

The inventors hereof have found that carbon composites formed from graphite and micro- or nano-sized binders at high temperatures have improved balanced properties as compared to graphite alone, a composition formed from the same graphite but different binders, or a mixture of the same graphite and the same binder blended at room temperature under atmospheric pressure or high pressures. The new carbon composites have excellent elasticity. In addition, the carbon composites have excellent mechanical strength, heat resistance, and chemical resistance at high temperatures. In a further advantageous feature, the composites keep various superior properties of the graphite such as heat conductivity, electrical conductivity, lubricity, and the like.

Without wishing to be bound by theory, it is believed that the improvement in mechanical strength is provided by a binding phase disposed among carbon microstructures. There are either no forces or only weak Van der Waals forces exist between the carbon microstructures, thus the graphite bulk materials have weak mechanical strength. At high temperatures, the micro- or nano-sized binder liquefies and/or softens so that it is dispersed evenly among carbon microstructures. Upon cooling, the binder solidifies and forms a binding phase binding the carbon nanostructures together through mechanical interlocking.

Further without wishing to be bound by theory, for the composites having both improved mechanical strength and improved elasticity, it is believed that the carbon microstructures themselves are laminar structures having spaces between the stacked layers. The binder only selectively locks the microstructures at their boundaries without penetrating the microstructures. Thus the unbounded layers within the microstructures provide elasticity and the binding phase disposed among the carbon microstructures provides mechanical strength.

The carbon microstructures are microscopic structures of graphite formed after compressing graphite into highly condensed state. They comprise graphite basal planes stacked together along the compression direction. As used herein, carbon basal planes refer to substantially flat, parallel sheets or layers of carbon atoms, where each sheet or layer has a single atom thickness. The graphite basal planes are also referred to as carbon layers. The carbon microstructures are generally flat and thin. They can have different shapes and can also be referred to as micro-flakes, micro-discs and the like. In an embodiment, the carbon microstructures are substantially parallel to each other.

There are two types of voids in the carbon composites—voids or interstitial spaces among carbon microstructures and voids within each individual carbon microstructures. The interstitial spaces among the carbon microstructures have a size of about 0.1 to about 100 microns, specifically about 1 to about 20 microns whereas the voids within the carbon microstructures are much smaller and are generally between about 20 nanometers to about 1 micron, specifically about 200 nanometers to about 1 micron. The shape of the voids or interstitial spaces is not particularly limited. As used herein, the size of the voids or interstitial spaces refers to the largest dimension of the voids or interstitial spaces and can be determined by high resolution electron or atomic force microscope technology.

The interstitial spaces among the carbon microstructures are filled with a micro- or nano-sized binder. For example, a binder can occupy about 10% to about 90% of the interstitial spaces among the carbon microstructures. However, the binder does not penetrate the individual carbon microstructures and the voids within the carbon microstructures are unfilled, i.e., not filled with any binder. Thus the carbon layers within the carbon microstructures are not locked together by a binder. Through this mechanism, the flexibility of the carbon composites, particularly, carbon composites containing expanded graphite microstructures can be preserved.

The carbon microstructures have a thickness of about 1 to about 200 microns, about 1 to about 150 microns, about 1 to about 100 microns, about 1 to about 50 microns, or about 10 to about 20 microns. The diameter or largest dimension of the carbon microstructures is about 5 to about 500 microns or about 10 to about 500 microns. The aspect ratio of the carbon microstructures can be about 10 to about 500, about 20 to about 400, or about 25 to about 350. In an embodiment, the distance between the carbon layers in the carbon microstructures is about 0.3 nanometers to about 1 micron. The carbon microstructures can have a density of about 0.5 to about 3 $g/cm^3$, or about 0.1 to about 2 $g/cm^3$.

As used herein, graphite includes one or more of the following: natural graphite; synthetic graphite; expandable graphite; or expanded graphite. Natural graphite is graphite formed by Nature. It can be classified as "flake" graphite, "vein" graphite, and "amorphous" graphite. Synthetic graphite is a manufactured product made from carbon materials. Pyrolytic graphite is one form of the synthetic graphite. Expandable graphite refers to graphite having intercallant materials inserted between layers of natural graphite or synthetic graphite. A wide variety of chemicals have been used to intercalate graphite materials. These include acids, oxidants, halides, or the like. Exemplary intercallant materials include sulfuric acid, nitric acid, chromic acid, boric acid, $SO_3$, or halides such as $FeCl_3$, $ZnCl_2$, and $SbCl_5$ Upon heating, the intercallant is converted from a liquid or solid state to a gas phase. Gas formation generates pressure which pushes adjacent carbon layers apart resulting in expanded graphite. The expanded graphite particles are vermiform in appearance, and are therefore commonly referred to as worms.

Advantageously, the carbon composites comprise expanded graphite microstructures. Compared with other forms of the graphite, expanded graphite has high flexibility, high compression recovery, and larger anisotropy. The composites formed from expanded graphite and a micro- or nano-sized binder under high pressure and high temperature conditions can thus have excellent elasticity in addition to desirable mechanical strength.

In the carbon composites, the carbon microstructures are held together by a binding phase. The binding phase comprises a binder which binds carbon microstructures by mechanical interlocking. Optionally, an interface layer is formed between the binder and the carbon microstructures. The interface layer can comprise chemical bonds, solid solutions, or a combination thereof. When present, the chemical bonds, solid solutions, or a combination thereof may strengthen the interlocking of the carbon microstructures. It is appreciated that the carbon microstructures may be held together by both mechanical interlocking and chemical bonding. For example the chemical bonding, solid solution, or a combination thereof may be formed between some carbon microstructures and the binder or for a particular carbon microstructure only between a portion of the carbon on the surface of the carbon microstructure and the binder. For the carbon microstructures or portions of the carbon microstructures that do not form a chemical bond, solid solution, or a combination thereof, the carbon microstructures can be bounded by mechanical interlocking. The thickness of the binding phase is about 0.1 to about 100 microns or about 1 to about 20 microns. The binding phase can form a continuous or discontinuous network that binds carbon microstructures together.

Exemplary binders include a nonmetal, a metal, an alloy, or a combination comprising at least one of the foregoing. The nonmetal is one or more of the following: $SiO_2$; Si; B; or $B_2O_3$. The metal can be at least one of aluminum; copper; titanium; nickel; tungsten; chromium; iron; manganese; zirconium; hafnium; vanadium; niobium; molybdenum; tin;

bismuth; antimony; lead; cadmium; or selenium. The alloy includes one or more of the following: aluminum alloys; copper alloys; titanium alloys; nickel alloys; tungsten alloys; chromium alloys; iron alloys; manganese alloys; zirconium alloys; hafnium alloys; vanadium alloys; niobium alloys; molybdenum alloys; tin alloys; bismuth alloys; antimony alloys; lead alloys; cadmium alloys; or selenium alloys. In an embodiment, the binder comprises one or more of the following: copper; nickel; chromium; iron; titanium; an alloy of copper; an alloy of nickel; an alloy of chromium; an alloy of iron; or an alloy of titanium. Exemplary alloys include steel, nickel-chromium based alloys such as Inconel*, and nickel-copper based alloys such as Monel alloys. Nickel-chromium based alloys can contain about 40-75% of Ni and about 10-35% of Cr. The nickel-chromium based alloys can also contain about 1 to about 15% of iron. Small amounts of Mo, Nb, Co, Mn, Cu, Al, Ti, Si, C, S, P, B, or a combination comprising at least one of the foregoing can also be included in the nickel-chromium based alloys. Nickel-copper based alloys are primarily composed of nickel (up to about 67%) and copper. The nickel-copper based alloys can also contain small amounts of iron, manganese, carbon, and silicon. These materials can be in different shapes, such as particles, fibers, and wires. Combinations of the materials can be used.

The binder used to make the carbon composite is micro- or nano-sized. In an embodiment, the binder has an average particle size of about 0.05 to about 10 microns, specifically, about 0.5 to about 5 microns, more specifically about 0.1 to about 3 microns. Without wishing to be bound by theory, it is believed that when the binder has a size within these ranges, it disperses uniformly among the carbon microstructures.

When an interface layer is present, the binding phase comprises a binder layer comprising a binder and an interface layer bonding one of the at least two carbon microstructures to the binder layer. In an embodiment, the binding phase comprises a binder layer, a first interface layer bonding one of the carbon microstructures to the binder layer, and a second interface layer bonding the other of the at least two microstructures to the binder layer. The first interface layer and the second interface layer can have the same or different compositions.

The interface layer comprises one or more of the following: a C-metal bond; a C—B bond; a C—Si bond; a C—O—Si bond; a C—O-metal bond; or a metal carbon solution. The bonds are formed from the carbon on the surface of the carbon microstructures and the binder.

In an embodiment, the interface layer comprises carbides of the binder. The carbides include one or more of the following: carbides of aluminum; carbides of titanium; carbides of nickel; carbides of tungsten; carbides of chromium; carbides of iron; carbides of manganese; carbides of zirconium; carbides of hafnium; carbides of vanadium; carbides of niobium; or carbides of molybdenum. These carbides are formed by reacting the corresponding metal or metal alloy binder with the carbon atoms of the carbon microstructures. The binding phase can also comprise SiC formed by reacting $SiO_2$ or Si with the carbon of carbon microstructures, or $B_4C$ formed by reacting B or $B_2O_3$ with the carbon of the carbon microstructures. When a combination of binder materials is used, the interface layer can comprise a combination of these carbides. The carbides can be salt-like carbides such as aluminum carbide, covalent carbides such as SiC and $B_4C$, interstitial carbides such as carbides of the group 4, 5, and 6 transition metals, or intermediate transition metal carbides, for example the carbides of Cr, Mn, Fe, Co, and Ni.

In another embodiment, the interface layer comprises a solid solution of carbon such as graphite and a binder. Carbon has solubility in certain metal matrix or at certain temperature ranges, which can facilitate both wetting and binding of a metal phase onto the carbon microstructures. Through heat-treatment, high solubility of carbon in metal can be maintained at low temperatures. These metals include one or more of Co; Fe; La; Mn; Ni; or Cu. The binder layer can also comprise a combination of solid solutions and carbides.

The carbon composites comprise about 20 to about 95 wt. %, about 20 to about 80 wt. %, or about 50 to about 80 wt. % of carbon, based on the total weight of the composites. The binder is present in an amount of about 5 wt. % to about 75 wt. % or about 20 wt. % to about 50 wt. %, based on the total weight of the composites. In the carbon composites, the weight ratio of carbon relative to the binder is about 1:4 to about 20:1, or about 1:4 to about 4:1, or about 1:1 to about 4:1.

FIG. 1 is a SEM image of a composition containing expanded graphite and a micro- or nano-sized binder blended at room temperature and atmospheric pressure. As shown in FIG. 1, the binder (white area) is only deposited on the surface of some of the expanded graphite worms.

Figure 2:
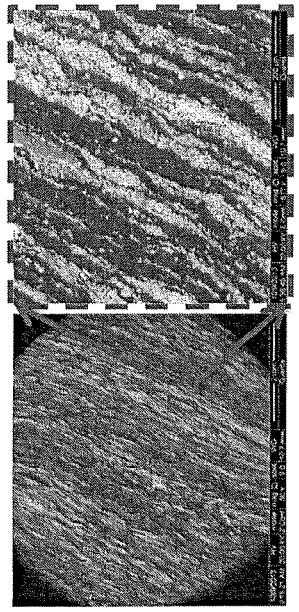
FIG. 2 is a SEM image of a carbon composite formed from expanded graphite and a micro- or nano-sized binder under high pressure and high temperature conditions according to an embodiment of the disclosure.

FIG. 2 is a SEM image of a carbon composite formed from expanded graphite and a micro- or nano-sized binder under high pressure and high temperature conditions. As shown in FIG. 2, a binding phase (light area) is evenly distributed among the expanded graphite microstructures (dark area).

Figure 3:
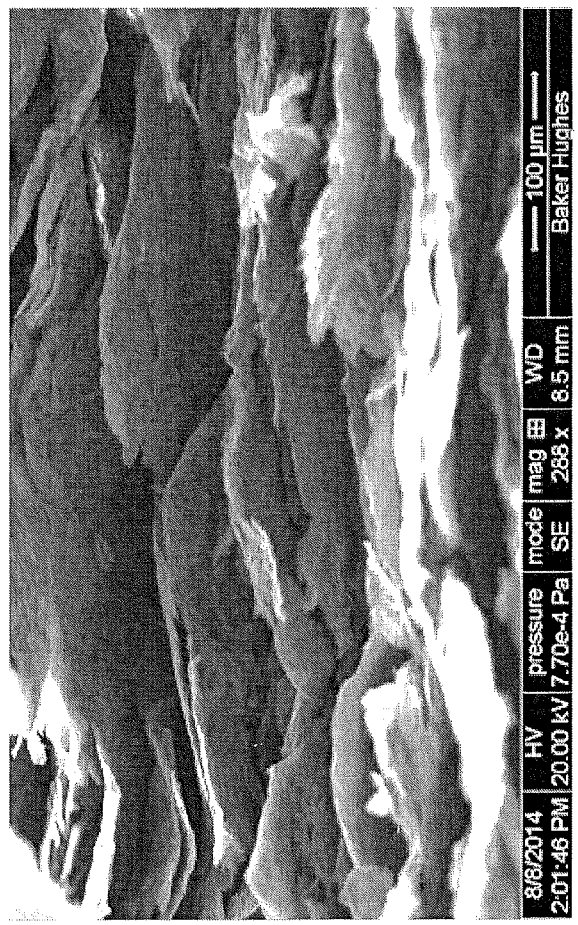
FIG. 3 is a SEM image of carbon microstructures according to another embodiment of the disclosure.
Figure 4:
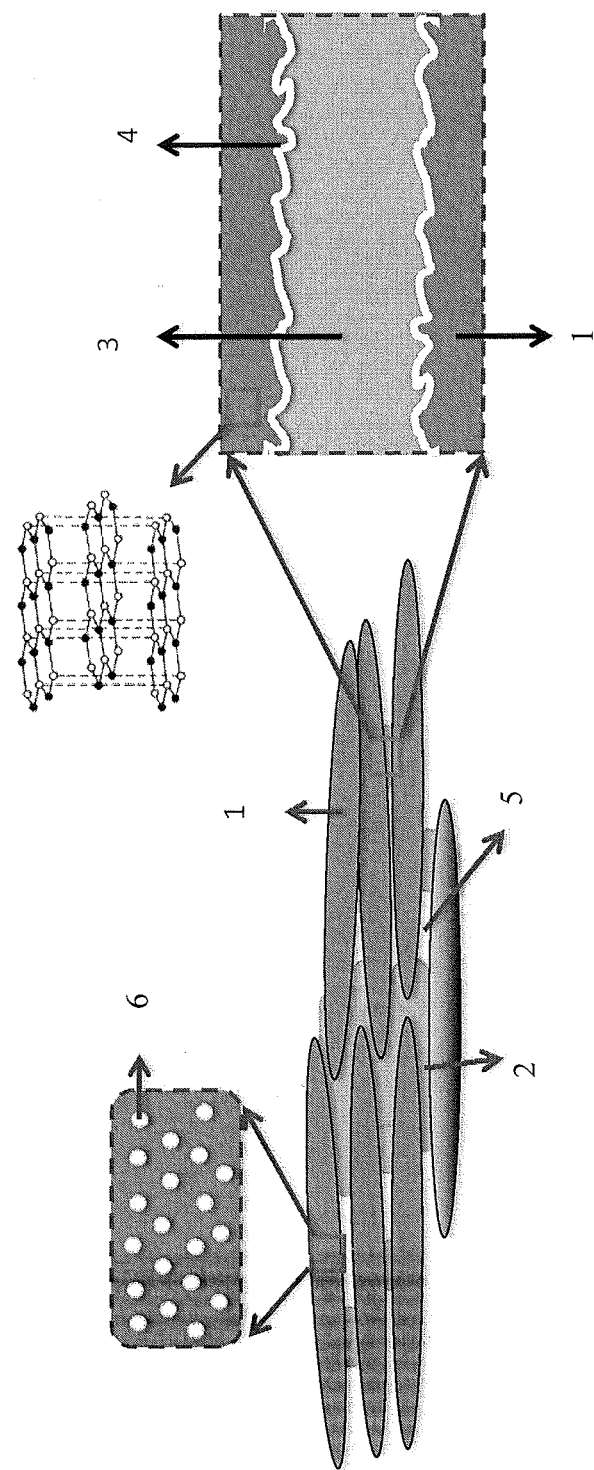
FIG. 4 is a schematic illustration of a carbon composite according to an embodiment of the disclosure.

A SEM image of carbon graphite microstructures is shown in FIG. 3. An embodiment of a carbon composite is illustrated in FIG. 4. As shown in FIG. 4, the composite comprises carbon microstructures 1 and binding phase 2 locking the carbon microstructures. The binding phase 2 comprises binder layer 3 and an optional interface layer 4 disposed between the binder layer 3 and the carbon microstructures 1. The carbon composite contains interstitial space 5 among carbon microstructures 1. Within carbon microstructures, there are unfilled voids 6.

The carbon composites can optionally comprise a filler. Exemplary filler includes one or more of the following: carbon fibers; carbon black; mica; clay; glass fibers; ceramic fibers; or ceramic hollow structures. Ceramic materials include SiC, $Si_3N_4$, $SiO_2$, BN, and the like. The filler can be present in an amount of about 0.5 to about 10 wt. % or about 1 to about 8%.

The composites can have any desired shape including a bar, block, sheet, tubular, cylindrical billet, toroid, powder, pellets, or other form that may be machined, formed or otherwise used to form useful articles of manufacture. The sizes or the dimensions of these forms are not particularly limited. Illustratively, the sheet has a thickness of about 10 µm to about 10 cm and a width of about 10 mm to about 2 m. The powder comprises particles having an average size of about 10 µm to about 1 cm. The pellets comprise particles having an average size of about 1 cm to about 5 cm.

One way to form the carbon composites is to compress a combination comprising carbon and a micro- or nano-sized binder to provide a green compact by cold pressing; and to compressing and heating the green compact thereby forming the carbon composites. In another embodiment, the combination can be pressed at room temperature to form a compact, and then the compact is heated at atmospheric pressure to form the carbon composite. These processes can be referred to as two-step processes. Alternatively, a combination comprising carbon and a micro- or nano-sized binder can be compressed and heated directly to form the carbon composites. The process can be referred to as a one-step process.

In the combination, the carbon such as graphite is present in an amount of about 20 wt. % to about 95 wt. %, about 20 wt. % to about 80 wt. %, or about 50 wt. % to about 80 wt. %, based on the total weight of the combination. The binder is present in an amount of about 5 wt. % to about 75 wt. % or about 20 wt. % to about 50 wt. %, based on the total weight of the combination. The graphite in the combination can be in the form of a chip, powder, platelet, flake, or the like. In an embodiment, the graphite is in the form of flakes having a diameter of about 50 microns to about 5,000 microns, preferably about 100 to about 300 microns. The graphite flakes can have a thickness of about 1 to about 5 microns. The density of the combination is about 0.01 to about 0.05 g/cm$^3$, about 0.01 to about 0.04 g/cm$^3$, about 0.01 to about 0.03 g/cm$^3$ or about 0.026 g/cm$^3$. The combination can be formed by blending the graphite and the micro- or nano-sized binder via any suitable methods known in the art. Examples of suitable methods include ball mixing, acoustic mixing, ribbon blending, vertical screw mixing, and V-blending.

Referring to the two-step process, cold pressing means that the combination comprising the graphite and the micro-sized or nano-sized binder is compressed at room temperature or at an elevated temperature as long as the binder does not significantly bond with the graphite microstructures. In an embodiment, greater than about 80 wt. %, greater than about 85 wt. %, greater than about 90 wt. %, greater than about 95 wt. %, or greater than about 99 wt. % of the microstructures are not bonded in the green compact. The pressure to form the green compact can be about 500 psi to about 10 ksi and the temperature can be about 20° C. to about 200° C. The reduction ratio at this stage, i.e., the volume of the green compact relative to the volume of the combination, is about 40% to about 80%. The density of the green compact is about 0.1 to about 5 g/cm$^3$, about 0.5 to about 3 g/cm$^3$, or about 0.5 to about 2 g/cm$^3$.

The green compact can be heated at a temperature of about 350° C. to about 1200° C., specifically about 800° C. to about 1200° C. to form the carbon composites. In an embodiment, the temperature is about ±20° C. to about ±100° C. of the melting point of the binder, or about ±20° C. to about ±50° C. of the melting point of the binder. In another embodiment, the temperature is above the melting point of the binder, for example, about 20° C. to about 100° C. higher or about 20° C. to about 50° C. higher than the melting point of the binder. When the temperature is higher, the binder becomes less viscose and flows better, and less pressure may be required in order for the binder to be evenly distributed in the voids among the carbon microstructures. However, if the temperature is too high, it may have detrimental effects to the instrument.

The temperature can be applied according to a predetermined temperature schedule or ramp rate. The means of heating is not particularly limited. Exemplary heating methods include direct current (DC) heating, induction heating, microwave heating, and spark plasma sintering (SPS). In an embodiment, the heating is conducted via DC heating. For example, the combination comprising the graphite and the micro- or nano-sized binder can be charged with a current, which flows through the combination generating heat very quickly. Optionally, the heating can also be conducted under an inert atmosphere, for example, under argon or nitrogen. In an embodiment, the green compact is heated in the presence of air.

The heating can be conducted at a pressure of about 500 psi to about 30,000 psi or about 1000 psi to about 5000 psi. The pressure can be a superatmospheric pressure or a subatmospheric pressure. Without wishing to be bound by theory, it is believed that when a superatmospheric pressure is applied to the combination, the micro- or nano-sized binder is forced into the voids among carbon microstructures through infiltration. When a subatmospheric pressure is applied to the combination, the micro- or nano-sized binder can also be forced into the voids among the carbon microstructures by capillary forces.

In an embodiment, the desirable pressure to form the carbon composites is not applied all at once. After the green compact is loaded, a low pressure is initially applied to the composition at room temperature or at a low temperature to close the large pores in the composition. Otherwise, the melted binder may flow to the surface of the die. Once the temperature reaches the predetermined maximum temperature, the desirable pressure required to make the carbon composites can be applied. The temperature and the pressure can be held at the predetermined maximum temperature and the predetermined maximum pressure for about 5 minutes to about 120 minutes. In an embodiment, the predetermined maximum temperature is about ±20° C. to about ±100° C. of the melting point of the binder, or about ±20° C. to about ±50° C. of the melting point of the binder.

The reduction ratio at this stage, i.e. the volume of the carbon composite relative to the volume of the green compact, is about 10% to about 70% or about 20 to about 40%. The density of the carbon composite can be varied by controlling the degree of compression. The carbon composites have a density of about 0.5 to about 10 g/cm$^3$, about 1 to about 8 g/cm$^3$, about 1 to about 6 g/cm$^3$, about 2 to about 5 g/cm$^3$, about 3 to about 5 g/cm$^3$, or about 2 to about 4 g/cm$^3$.

Alternatively, also referring to a two-step process, the combination can be first pressed at room temperature and a pressure of about 500 psi to 30,000 psi to form a compact; the compact can be further heated at a temperature of about 350° C. to about 1200° C., specifically about 800° C. to about 1200° C. to make the carbon composite. In an embodiment, the temperature is about ±20° C. to about ±100° C. of the melting point of the binder, or about ±20° C. to about ±50° C. of the melting point of the binder. In another embodiment, the temperature can be about 20° C. to about 100° C. higher or about 20° C. to about 50° C. higher than the melting point of the binder. The heating can be conducted at atmospheric pressure in the presence or absence of an inert atmosphere.

In another embodiment, the carbon composite can be made from the combination of the graphite and the binder directly without making the green compact. The pressing and the heating can be carried out simultaneously. Suitable pressures and temperatures can be the same as discussed herein for the second step of the two-step process.

Hot pressing is a process that applies temperature and pressure simultaneously. It can be used in both the one-step and the two-step processes to make carbon composites.

The carbon composites can be made in a mold through a one-step or a two-step process. The obtained carbon composites can be further machined or shaped to form a bar, block, tubular, cylindrical billet, or toroid. Machining includes cutting, sawing, ablating, milling, facing, lathing, boring, and the like using, for example, a miller, saw, lathe, router, electric discharge machine, and the like. Alternatively, the carbon composite can be directly molded to the useful shape by choosing the molds having the desired shape.

Sheet materials such as web, paper, strip, tape, foil, mat or the like can also be made via hot rolling. In an embodiment, the carbon composite sheets made by hot rolling can be further heated to allow the binder to effectively bond the carbon microstructures together.

Carbon composite pellets can be made by extrusion. For example, a combination of the graphite and the micro- or nano-sized binder can be first loaded in a container. Then combination is pushed into an extruder through a piston. The extrusion temperature can be about 350° C. to about 1200° C. or about 800° C. to about 1200° C. In an embodiment, the temperature is about ±20° C. to about ±100° C. of the melting point of the binder, or ±20° C. to about ±50° C. of the melting point of the binder. In another embodiment, the extrusion temperature is higher than the melting point of the binder, for example, about 20 to about 50° C. higher than the melting point of the binder. In an embodiment, wires are obtained from the extrusion, which can be cut to form pellets. In another embodiment, pellets are directly obtained from the extruder. Optionally, a post treatment process can be applied to the pellets. For example, the pellets can be heated in a furnace above the melting temperature of the binder so that the binder can bond the carbon microstructures together if the carbon microstructures have not been bonded or not adequately bonded during the extrusion.

Carbon composite powder can be made by milling carbon composites, for example a solid piece, through shearing forces (cutting forces). It is noted that the carbon composites should not be smashed. Otherwise, the voids within the carbon microstructures may be destroyed thus the carbon composites lose elasticity.

The carbon composites have a number of advantageous properties and can be used in a wide variety of applications. In an especially advantageous feature, by forming carbon composites, both the mechanical strength and the elastomeric properties of the carbon such as graphite are improved.

Figure 5:
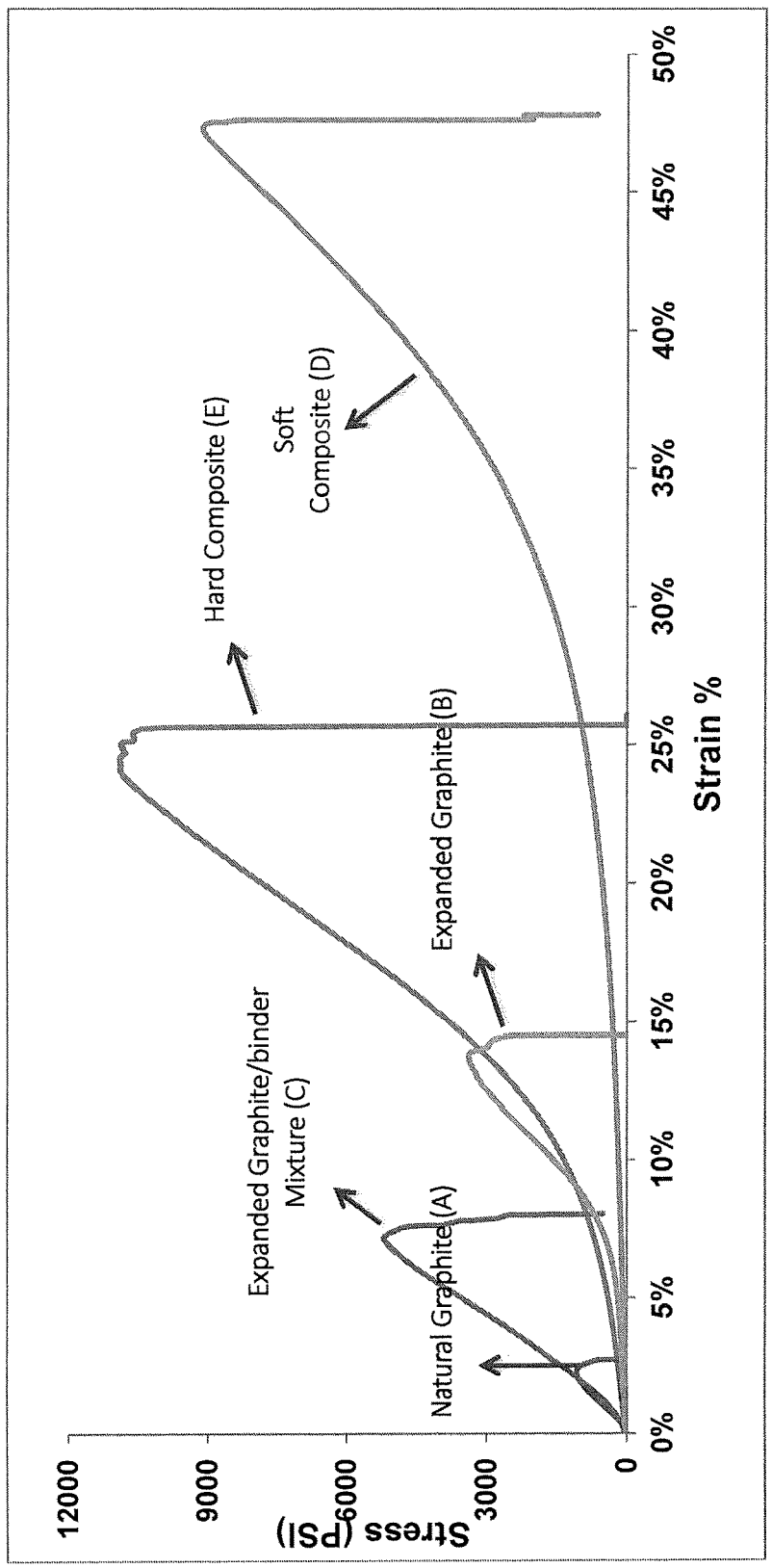
FIG. 5 shows stress-strain curves of (A) natural graphite; (B) expanded graphite; (C) a mixture of expanded graphite and a micro- or nano-sized binder, where the sample is compacted at room temperature and high pressure; (D) a carbon composite according to one embodiment of the disclosure compacted from a mixture of expanded graphite and a micro- or nano-sized binder at a high temperature and a low pressure (also referred to as "soft composite"); and (E) a carbon composite according to another embodiment of the disclosure formed from expanded graphite and a micro- or nano-sized binder under high pressure and high temperature conditions (also referred to as "hard composite")

To illustrate the improvement of elastic energy achieved by the carbon composites, the stress-strain curves for the following samples are shown in FIG. 5: (A) natural graphite, (B) expanded graphite, (C) a mixture of expanded graphite and a micro- or nano-sized binder formed at room temperature and atmospheric pressure, (D) a mixture of expanded graphite and a micro- or nano-sized binder formed at a high temperature and a low pressure ("soft carbon composite"); and (E) a carbon composite formed from expanded graphite and a micro- or nano-sized binder under high pressure and high temperature conditions ("hard carbon composite"). For the natural graphite, the sample was made by compressing natural graphite in a steel die at a high pressure. The expanded graphite sample (B) was also made in a similar manner.

As shown in FIG. 5, the natural graphite (A) has a very low elastic energy (area under the stress-strain curve) and is very brittle. The elastic energy of expanded graphite (B) and the elastic energy of the mixture of expanded graphite and a micro- or nano-sized binder compacted at room temperature and high pressure (C) is higher than that of the natural graphite (A). Conversely, both the hard and soft carbon composites (E and D) of the disclosure exhibit significantly improved elasticity shown by the notable increase of the elastic energy as compared to the natural graphite alone (A), the expanded graphite alone (B), and the mixture of expanded graphite and binder compacted at room temperature and high pressure (C). In an embodiment, the carbon composites of the disclosure have an elastic elongation of greater than about 4%, greater than about 6%, or between about 4% and about 40%.

Figure 6:
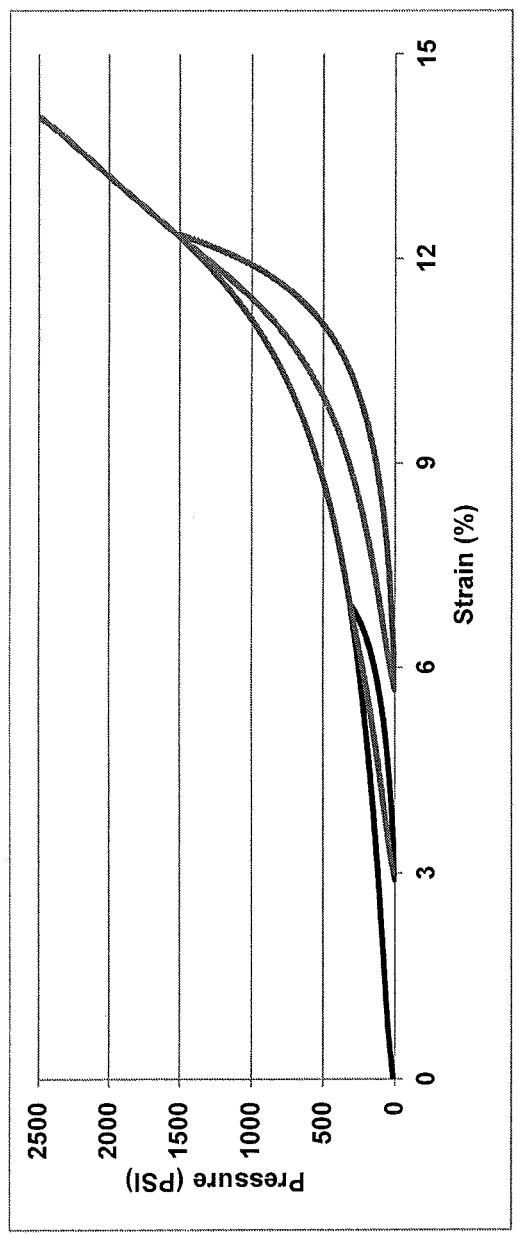
FIG. 6 shows loop test results of a carbon composite at different loadings.
Figure 7:
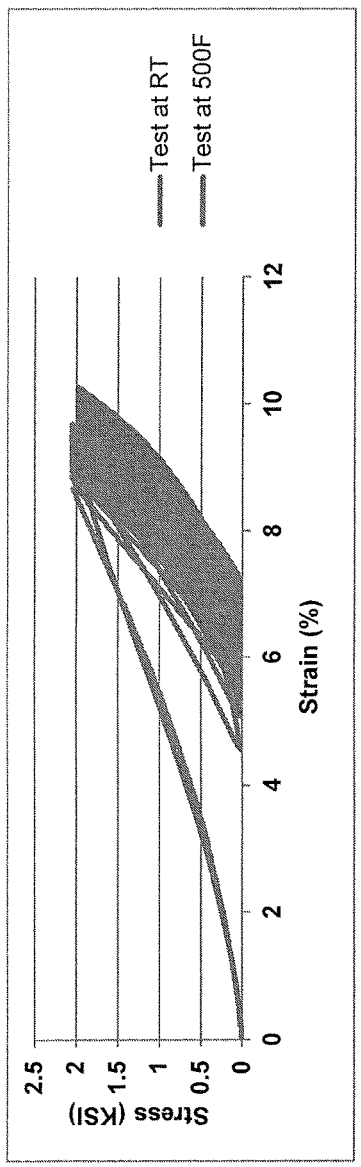
FIG. 7 shows hysteresis results of a carbon composite tested at room temperature and 500° F. respectively.

The elasticity of the carbon composites is further illustrated in FIGS. 6 and 7. FIG. 6 shows loop test results of a carbon composite at different loadings. FIG. 7 shows hysteresis results of a carbon composite tested at room temperature and 500° F. respectively. As shown in FIG. 7, the elasticity of the carbon composite is maintained at 500° F.

Figure 8:
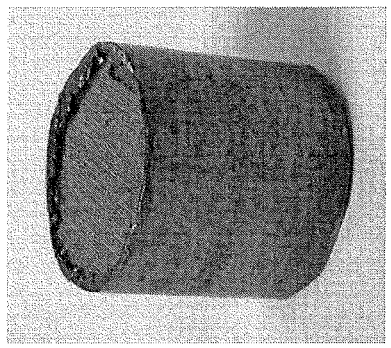
FIG. 8 compares a carbon composite before and after exposing to air at 500° C. for 5 days.
Figure 8:
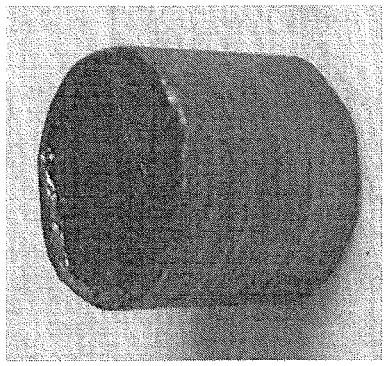
Figure 9A:
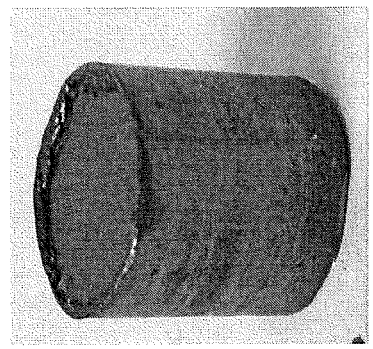
FIG. 9 (A) is a photo of a carbon composite after a thermal shock.
Figure 9B:
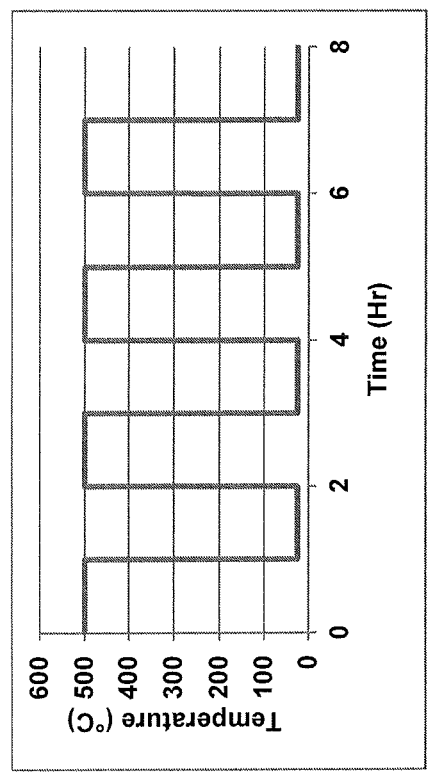

In addition to improved mechanical strength and elasticity, the carbon composites can also have excellent thermal stability at high temperatures. FIG. 8 compares a carbon composite before and after exposing to air at 500° C. for 5 days. FIG. 9 (A) is a photo of a carbon composite sample after a thermo shock for 8 hours. The condition for the thermal shock is shown in FIG. 9(B). As shown in FIGS. 8 and 9(A), there are no changes to the carbon composite sample after exposing to air at 500° C. for 5 days or after the thermal shock. The carbon composites can have high thermal resistance with a range of operation temperatures from about −65° F. up to about 1200° F., specifically up to about 1100° F., and more specifically about 1000° F.

Figure 10A:
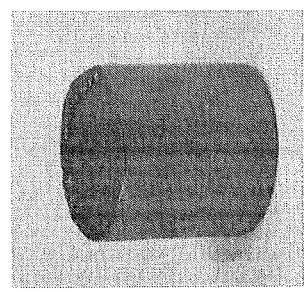
FIGS. 10A-C compares a carbon composite sample before (FIG. 10A) and after (FIG. 10B) exposing to tap water for 20 hours at 200° F., or after exposing to tap water for 3 days at 200° F.
Figure 10B:
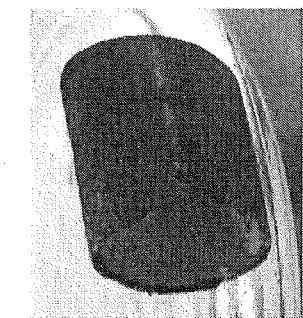
Figure 10C:
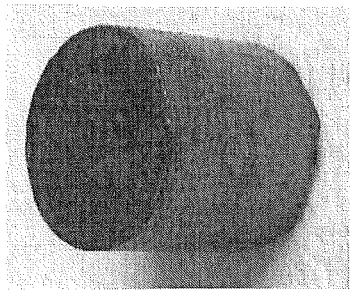
Figure 11A:
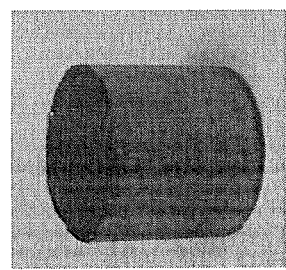
FIGS. 11A-C compares a carbon composite sample before (FIG. 11A) and after (FIG. 11B) exposing to 15% HCl solution with inhibitor at 200° F. for 20 hours, or after exposing to 15% HCl solution at 200° F. for 3 days (FIG. 10C)
Figure 11B:
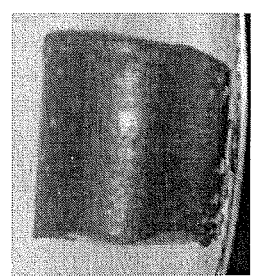
Figure 11C:
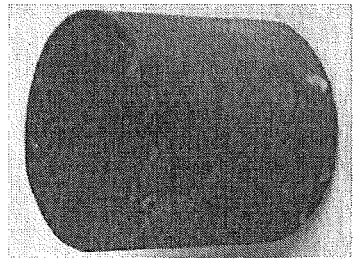

The carbon composites can also have excellent chemical resistance at elevated temperatures. In an embodiment, the composites are chemically resistant to water, oil, brines, and acids with resistance rating from good to excellent. In an embodiment, the carbon composites can be used continuously at high temperatures and high pressures, for example, about 68° F. to about 1200° F., or about 68° F. to about 1000° F., or about 68° F. to about 750° F. under wet conditions, including basic and acidic conditions. Thus, the carbon composites resist swelling and degradation of properties when exposed to chemical agents (e.g., water, brine, hydrocarbons, acids such as HCl, solvents such as toluene, etc.), even at elevated temperatures of up to 200° F., and at elevated pressures (greater than atmospheric pressure) for prolonged periods. The chemical resistance of the carbon composites is illustrated in FIGS. 10A-10C and 11A-11C. FIGS. 10A-10C compares a carbon composite sample before and after exposing to tap water for 20 hours at 200° F., or after exposing to tap water for 3 days at 200° F. As shown in FIG. 10, there are no changes to the sample. FIGS. 11A-11C compares a carbon composite sample before and after exposing to 15% HCl solution with inhibitor at 200° F. for 20 hours, or after exposing to 15% HCl solution at 200° F. for 3 days. Again, there are no changes to the carbon composite sample.

The carbon composites are medium hard to extra hard with harness from about 50 in SHORE A up to about 75 in SHORE D scale.

Figure 12:
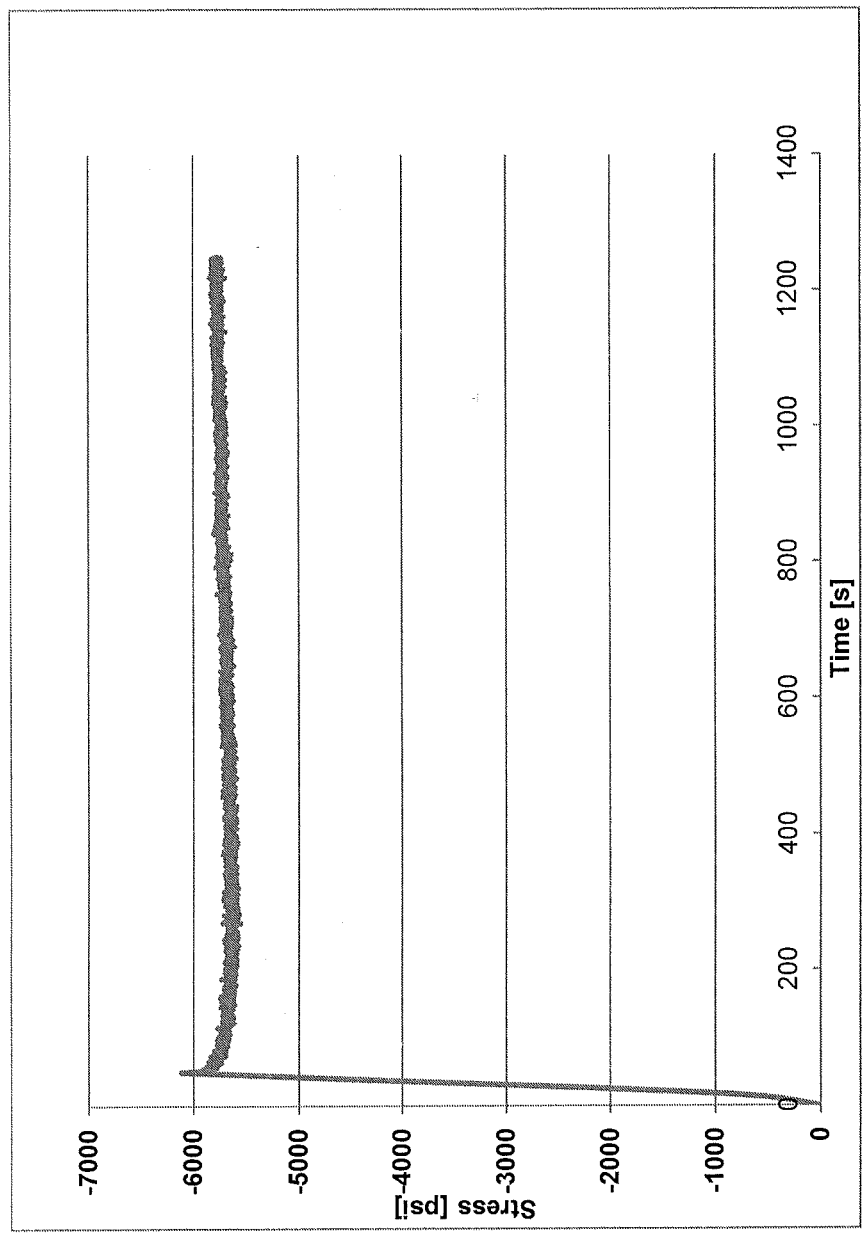
FIG. 12 shows the sealing force relaxation test results of a carbon composite at 600° F.

As a further advantageous feature, the carbon composites have a stable sealing force at high temperatures. The stress decay of components under constant compressive strain is known as compression stress relaxation. A compression stress relaxation test also known as sealing force relaxation test measures the sealing force exerted by a seal or O-ring under compression between two plates. It provides definitive information for the prediction of the service life of materials by measuring the sealing force decay of a sample as a function of time, temperature and environment. FIG. 12 shows the sealing force relaxation test results of a carbon composite sample at 600° F. As shown in FIG. 12, the sealing force of the carbon composite is stable at high temperatures. In an embodiment, the sealing force of a sample of the composite at 15% strain and 600° F. is maintained at about 5800 psi without relaxation for at least 20 minutes.

The carbon composites are useful for preparing articles for a wide variety of applications including but are not limited to electronics, atomic energy, hot metal processing, coatings, aerospace, automotive, oil and gas, and marine applications. The carbon composites may be used to form all or a portion of an article. Accordingly, articles comprising the carbon composites are provided. The articles include a sealing element, a heat release or exchange element, or a friction reducing element.

Illustrative sealing elements include, for example, seals such as static seals or dynamic seals; seal seats; packoffs seals such as retrievable cementing packoff, polished bore receptacle packoff, wireline packoff; packers; joint sheets; gaskets; bridge plugs; packing, such as pump packing, valve packing, or the like. There can be overlap among different types of sealing elements. Static seals refer to seals between two stable and immovable components and include C-rings, E-rings, O-rings, U-rings, T-rings, L-rings, rectangular rings, square rings, x-sectioned rings, and the like. Dynamic seals are not particularly limited and include any seals between a pair of relatively movable members. A gasket is a mechanical seal which fills the space between two or more mating surfaces. Exemplary gaskets include high performance gaskets subject to pressure and heat, for example, head gaskets and exhaust gaskets for automobiles and flange gaskets for refineries. The sealing elements have excellent elastic properties. Thus they can fill in the gaps and imperfections in the surfaces to be sealed providing fluid-tight or airtight seals. The sealing elements can further have high heat resistance and durability and can be used in a wide temperature ranges.

The carbon composites of the disclosure have high thermal conductivity and anisotropy and can be used to manufacture heat release or exchange elements. Heat release elements are typically used for rapidly releasing heat generated from electronic devices or components such as computer, CPU, and power transistor. Heat exchange elements transfer heat from one medium to another and are used in space heating, refrigeration, air conditioning power plants, chemical plants, petrochemical plants, petroleum refineries, natural gas processing, sewage treatment, and the like. Illustrative heat release or exchange elements include heat sinks, cooling systems, heating radiating components, and heat exchangers. In an embodiment the heat release element is a heat sink for laptop computers which keeps them cool while saving weight.

The carbon composites of the disclosure have high strength, high hardness, and superior self-lubricating properties. Thus articles comprising the carbon composites can be a friction reducing element such as bearings, bearing seats, coatings, and the like.

The articles can be a downhole element. Illustrative articles include seals, high pressure beaded frac screen plugs, screen base pipe plugs, coatings for balls and seats, compression packing elements, expandable packing elements, O-rings, bonded seals, bullet seals, sub-surface safety valve seals, sub-surface safety valve flapper seal, dynamic seals, V-rings, back-up rings, drill bit seals, liner port plugs, atmospheric discs, atmospheric chamber discs, debris barriers, drill in stim liner plugs, inflow control device plugs, flappers, seats, ball seats, direct connect disks, drill-in linear disks, gas lift valve plug, fluid loss control flappers, electric submersible pump seals, shear out plugs, flapper valves, gaslift valves, and sleeves.

The carbon composites have a high thermal resistance with a range of operation temperatures from about −65° F. up to about 1200° F. Accordingly, the downhole articles such as packers can be used to produce hydrocarbons from a subterranean location having an ambient temperature of greater than 750° F. or greater than 1000° F. In an embodiment, the articles of the disclosure are continuously resistive to one or more of thermal cracking, thermal degradation or thermal decomposition, at an ambient temperature of greater than 750° F. for more than 30 days. As used herein, "continuously resistive" means that less than about 10 wt %, less than about 5 wt. %, less than about 2 wt. %, or less than about 1 wt. % of the carbon composite or the article containing the carbon composite is thermally cracked, thermally degraded, and/or thermally decomposed.

The downhole articles can also be used to isolate or complete a wellbore. The method comprises deploying an apparatus comprising one or more of the downhole articles in a wellbore. For example, the article can be of a type suited for filling an annulus within a borehole in a location surrounding one or more production tubulars. As used herein, the term "production tubulars" is defined to include, for example, any kind of tubular that is used in completing a well, such as, but not limited to, production tubing, production casing, intermediate casings, and devices through which hydrocarbons flow to the surface. Examples of such article include, in non-limiting embodiments, annular isolators used to block off non-targeted production or water zones, and the like.

The articles can be made directly from a composition containing carbon such as graphite and a binder through a one-step or a two-step process under the same conditions as described herein for carbon composites by choosing a mold having the desired shape. Alternatively, the articles are formed from carbon composites by shaping or machining or a combination thereof. Shaping includes molding, extruding, casting, and laminating. Machining includes cutting, sawing, ablating, milling, facing, lathing, boring, and the like using, for example, a miller, saw, lathe, router, electric discharge machine, and the like. The forms of the carbon composites used to make the articles are not particularly limited and include for example powders, pellets, sheets, bars, blocks, tubulars, cylindrical billets, toroids, and the alike.

All ranges disclosed herein are inclusive of the endpoints, and the endpoints are independently combinable with each other. The suffix "(s)" as used herein is intended to include both the singular and the plural of the term that it modifies, thereby including at least one of that term (e.g., the colorant(s) includes at least one colorants). "Or" means "and/or." "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like. "A combination thereof" means "a combination comprising one or more of the listed items and optionally a like item not listed." All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. An article comprising a carbon composite containing carbon microstructures having interstitial spaces among the carbon microstructures; and a binder disposed in at least some of the interstitial spaces;
wherein the carbon microstructures comprise microstructures of expanded graphite, the carbon microstructures have a thickness of about 10 to about 20 microns and an aspect ratio of about 25 to about 350 and comprise unfilled voids within the carbon microstructures, the unfilled voids having a size of about 200 nanometers to about 1 micron; and
the binder comprises a nickel-based alloy, a chromium-based alloy, an iron-based alloy, a titanium-based alloy, or a combination comprising at least one of the foregoing, and the binder is present in an amount of 20 to 50 wt. % based on the total weight of the carbon composite.

2. The article of claim 1, wherein the article is a sealing element, a heat release or exchange element, or a friction reducing element.

3. The article of claim 2, wherein the sealing element is a seal; a seal seat; a seal assembly; a packoff seal; a packer; a joint sheet; a gasket; a bridge plug;
or packing.

4. The article of claim 3, wherein the seal is a static seal; a dynamic seal; a retrievable cementing packoff; a polished bore receptacle packoff; a wireline packoff; a head gasket; an exhaust gasket, a flange gasket; a valve packing; or a pump packing.

5. The article of claim 2, wherein the heat release or exchange element is a heat sink; a cooling system; a heating radiating component; or a heat exchanger.

6. The article of claim 2, wherein the friction reducing element is a bearing; a bearing seat; or a coating.

7. The article of claim 1, wherein the article is a downhole element comprising a seal, a high pressure beaded frac screen plug; a screen base pipe plug; a coating for balls and seats; a compression packing element; an expandable packing element; an O-ring; a bonded seal; a bullet seal; a sub-surface safety valve seal; a sub-surface safety valve flapper seal; a dynamic seal; a V-ring; a back-up ring; a drill bit seal; a liner port plug; an atmospheric disc; an atmospheric chamber disc; a debris barrier; a drill in stim liner plug; an inflow control device plug; a flapper; a seat; a ball seat; a direct connect disk; a drill-in linear disk; a gas lift valve plug; a fluid loss control flapper; an electric submersible pump seal; a shear out plug; a flapper valve; a gaslift valve; or a sleeve.

8. An article comprising carbon composite containing:
at least two carbon microstructures, the at least two carbon microstructures having a thickness of about 10 to about 20 microns and an aspect ratio of about 25 to about 350 and comprising microstructures of expanded graphite; and a binding phase disposed between the at least two carbon microstructures;
wherein the binding phase comprises a binder layer and an interface layer bonding one of the at least two carbon microstructures to the binder layer, the binder layer comprising a binder which comprises a nickel-based alloy, a chromium-based alloy, an iron-based alloy, a titanium-based alloy, or a combination comprising at least one of the foregoing, and the binder is present in an amount of 20 to 50 wt. % based on the total weight of the carbon composite; and
wherein the interface layer comprises at least one of the following: a C-metal bond; a C—O-metal bond; or a metal carbon solid solution, and the metal is at least one of nickel; chromium; iron; or titanium.

9. The article of claim 8, wherein the article is a sealing element, a heat release or exchange element, or a friction reducing element.

10. The article of claim 9, wherein the sealing element is a seal; a seal seat; a seal assembly; a packoff seal; a packer; a joint sheet; a gasket; a bridge plug; or packing.

11. The article of claim 10, wherein the seal is a static seal; a dynamic seal; a retrievable cementing packoff; a polished bore receptacle packoff; a wireline packoff; a head gasket; an exhaust gasket; a flange gasket; a valve packing; or a pump packing.

12. The article of claim 9, wherein the heat release or exchange element is a heat sink; a cooling system; a heating radiating component; or a heat exchanger.

13. The article of claim 9, wherein the friction reducing element is a bearing; a bearing seat; or a coating.

14. The article of claim 8, wherein the article is a downhole element comprising a seal; a high pressure beaded frac screen plug; a screen base pipe plug; a coating for balls and seats; a compression packing element; an expandable packing element; an O-ring; a bonded seal; a bullet seal; a sub-surface safety valve seal; a sub-surface safety valve flapper seal; a dynamic seal; a V-ring; a back-up ring; a drill bit seal; a liner port plug; an atmospheric disc; an atmospheric chamber disc; a debris barrier; a drill in stim liner plug; an inflow control device plug; a flapper; a seat; a ball seat; a direct connect disk; a drill-in linear disk; a gas lift valve plug; a fluid loss control flapper; an electric submersible pump seal; a shear out plug; a flapper valve; a gaslift valve; or a sleeve.

15. The article of claim 1, wherein the article is continuously resistive to one or more of thermal cracking, thermal degradation or thermal decomposition, at an ambient temperature of greater than 750° F. for more than 30 days.

16. The article of claim 1, wherein the binder is free of silicon.

17. The article of claim 8, wherein the binding phase has a thickness of about 1 to about 20 microns.

18. An article comprising carbon composite containing:
at least two carbon microstructures, the at least two carbon microstructures having a thickness of about 10 to about 20 microns and an aspect ratio of about 25 to about 350 and comprising microstructures of expanded graphite; the carbon microstructures comprising unfilled voids within the carbon microstructures, the unfilled voids having a size of about 200 nanometers to about 1 micron; and
a binding phase disposed between the at least two carbon microstructures;
wherein the binding phase comprises a binder comprising a nickel-based alloy, a chromium-based alloy, an iron-based alloy, a titanium-based alloy, or a combination comprising at least one of the foregoing, and the binder is present in an amount of 20 to 50 wt. % based on the total weight of the carbon composite, and the binding phase is free of silicon.

19. The article of claim 1, wherein the carbon composite further comprises 1 to 8 wt % of a filler comprising one or more of the following: carbon fibers, carbon black, mica, clay, glass fibers, ceramic fibers, a ceramic hollow.

20. The article of claim 1, wherein the carbon microstructures are substantially parallel.

21. The article of claim 1, wherein the carbon microstructures have a density of about 0.5 to about 3 g/cm$^3$.

22. The article of claim 1, wherein the carbon microstructures have a density of about 0.1 to about 2 g/cm$^3$.

23. The article of claim 1, wherein the carbon composite comprises about 50 to about 80 wt % of the carbon microstructures based on the total weight of the carbon composite.

* * * * *